US009443422B2

(12) United States Patent
Pilat et al.

(10) Patent No.: US 9,443,422 B2
(45) Date of Patent: Sep. 13, 2016

(54) FREQUENCY SHIFTING METHOD FOR UNIVERSAL TRANSMITTERS

(71) Applicants: Gentex Corporation, Zeeland, MI (US); Horia-Eduard Pilat, Pulheim (DE); Carl L. Shearer, Hudsonville, MI (US); Todd R. Witkowski, Zeeland, MI (US)

(72) Inventors: Horia-Eduard Pilat, Pulheim (DE); Carl L. Shearer, Hudsonville, MI (US); Todd R. Witkowski, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/441,110

(22) PCT Filed: Nov. 7, 2012

(86) PCT No.: PCT/US2012/063857
§ 371 (c)(1),
(2) Date: May 6, 2015

(87) PCT Pub. No.: WO2014/074094
PCT Pub. Date: May 15, 2014

(65) Prior Publication Data

US 2015/0302729 A1 Oct. 22, 2015

(51) Int. Cl.
*G05B 19/00* (2006.01)
*G08C 17/02* (2006.01)
*G08C 19/28* (2006.01)

(52) U.S. Cl.
CPC ............... *G08C 17/02* (2013.01); *G08C 19/28* (2013.01); *G08C 2201/20* (2013.01); *G08C 2201/92* (2013.01)

(58) Field of Classification Search
CPC .. G08C 17/02; G08C 19/28; G08C 2201/92; G08C 2201/20
USPC ........................................................ 340/5.25
See application file for complete search history.

(56) References Cited

U.S. PATENT DOCUMENTS

2006/0139102 A1* 6/2006 Tucholski ............. G06F 1/0328 331/1 A
2008/0068205 A1* 3/2008 Witkowski ............. B60R 25/24 340/4.3
2010/0007516 A1* 1/2010 Bos ........................ G08C 17/02 340/12.23

FOREIGN PATENT DOCUMENTS

DE 197 57 235 A1 7/1999
GB 2 315 892 A 2/1998
WO WO-2010/109295 A1 9/2010

OTHER PUBLICATIONS

International Preliminary Report on Patentability and Written Opinion of the International Searching Authority dated May 21, 2015, received in corresponding International Application No. PCT/US2012/063857, 8 pages.

(Continued)

*Primary Examiner* — Dhaval Patel
(74) *Attorney, Agent, or Firm* — Foley & Lardner LLP; Scott P. Ryan

(57) ABSTRACT

Methods and systems for modifying a carrier frequency for a trainable transmitter may include receiving a request to transmit a control signal from the trainable transmitter to a receiver. A transmission of a first control signal may be made using a trained carrier frequency and a control data. At least part of the carrier frequency may be shifted by a frequency increment. A second control signal may then be generated using the carrier frequency shifted by the frequency increment and the control data. The second control signal may then be transmitted.

16 Claims, 8 Drawing Sheets

(56) References Cited

OTHER PUBLICATIONS

International Search Report in PCT/US2012/063857 dated Jan. 8, 2013, 3 pages.

Examination Report in corresponding European Application No. 12790758.2, dated Mar. 1, 2016, 6 pages.

* cited by examiner

FREQUENCY SHIFTING METHOD FOR UNIVERSAL TRANSMITTERS

CROSS REFERENCE TO RELATED APPLICATIONS

The present application is a U.S. National Stage of International Application No. PCT/US2012/063857 filed on Nov. 7, 2012.

BACKGROUND

Electronically operated remote control systems, such as garage door opener systems, home security systems, home lighting systems, gate controllers, etc., may employ a portable, hand-held transmitter (i.e., an original transmitter) to transmit a control signal to a receiver located at the remote control system. For example, a garage door opener system may include a receiver located within a home owner's garage and coupled to the garage door opener. A user may press a button on the original transmitter to transmit a radio frequency signal to the receiver to activate the garage door opener to open and close a garage door. Accordingly, the receiver may be tuned to the frequency of its associated original transmitter and may demodulate a predetermined code programmed into both the original transmitter and the receiver for operating the garage door.

As an alternative to a portable, hand-held original transmitter, a trainable transmitter or transceiver may be provided in a vehicle for use with remote control systems. A trainable transmitter may be configurable by a user to activate one or more of a plurality of different wireless control system receivers using different radio frequency messages. A user may train the trainable transmitter to an existing original transmitter by holding the two transmitters in close range and pressing buttons on the original transmitter and the trainable transmitter. The trainable transmitter may identify the type of remote control system associated with the original transmitter based on a radio frequency signal received from the original transmitter. For example, the trainable transmitter may identify and store the control code and carrier frequency of the original transmitter radio frequency ("RF") control signal. Once trained, the trainable transceiver may be used to transmit RF signals to control the remote control system.

In a transmission mode, a user may press an input device, e.g., a button, of the trainable transmitter that has been trained to a particular remote control system, for example, a garage door opener. In response to the user input, the trainable transmitter may retrieve the carrier frequency and control data associated with the button pressed, generate a carrier signal with the appropriate carrier frequency and modulate control data on the carrier signal to generate an RF control signal to control the garage door opener. The RF control signal may be transmitted to the garage door opener.

SUMMARY

One implementation relates to a method for modifying a trained carrier frequency for a trainable transmitter. The method may include receiving a request to transmit a control signal from the trainable transmitter to a receiver. A first control signal using the trained carrier frequency and control data may be transmitted. At least part of the trained carrier frequency may be shifted by a first frequency increment. A second control signal using the incrementally-shifted trained carrier frequency and the control data may be transmitted.

In another implementation, an apparatus for transmitting a control signal to a receiver may include a transmitter and a processing module coupled to the transmitter. The processing module may be configured to receive a request to transmit a control signal to a receiver. A first control signal using a trained carrier frequency and control data may be generated for transmission using the transmitter. At least part of the trained carrier frequency may be shifted by a first frequency increment. A second control signal using the incrementally-shifted trained carrier frequency and the control data may be generated for transmission using the transmitter. At least part of the trained carrier frequency may be shifted by a first frequency decrement. A third control signal using the decrementally-shifted trained carrier frequency and the control data may be generated for transmission using the transmitter.

In yet another implementation, a method for modifying a trained carrier frequency for a trainable transmitter may include transmitting a first control signal using the trained carrier frequency having a first peak and a second peak and a control data. The trained carrier frequency may be shifted by a frequency value of an increment or decrement. A second control signal using the shifted trained carrier frequency and the control data may be transmitted. The trained carrier frequency may be shifted by the frequency value and a first peak of the trained carrier frequency may be shifted relative to the second peak by a peak frequency value of an increment or decrement. A third control signal using the trained carrier frequency shifted by the frequency value and the first peak shifted by the peak frequency value and the control data may be transmitted.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and embodiments of, methods, apparatuses, and systems for operating a wireless control system. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
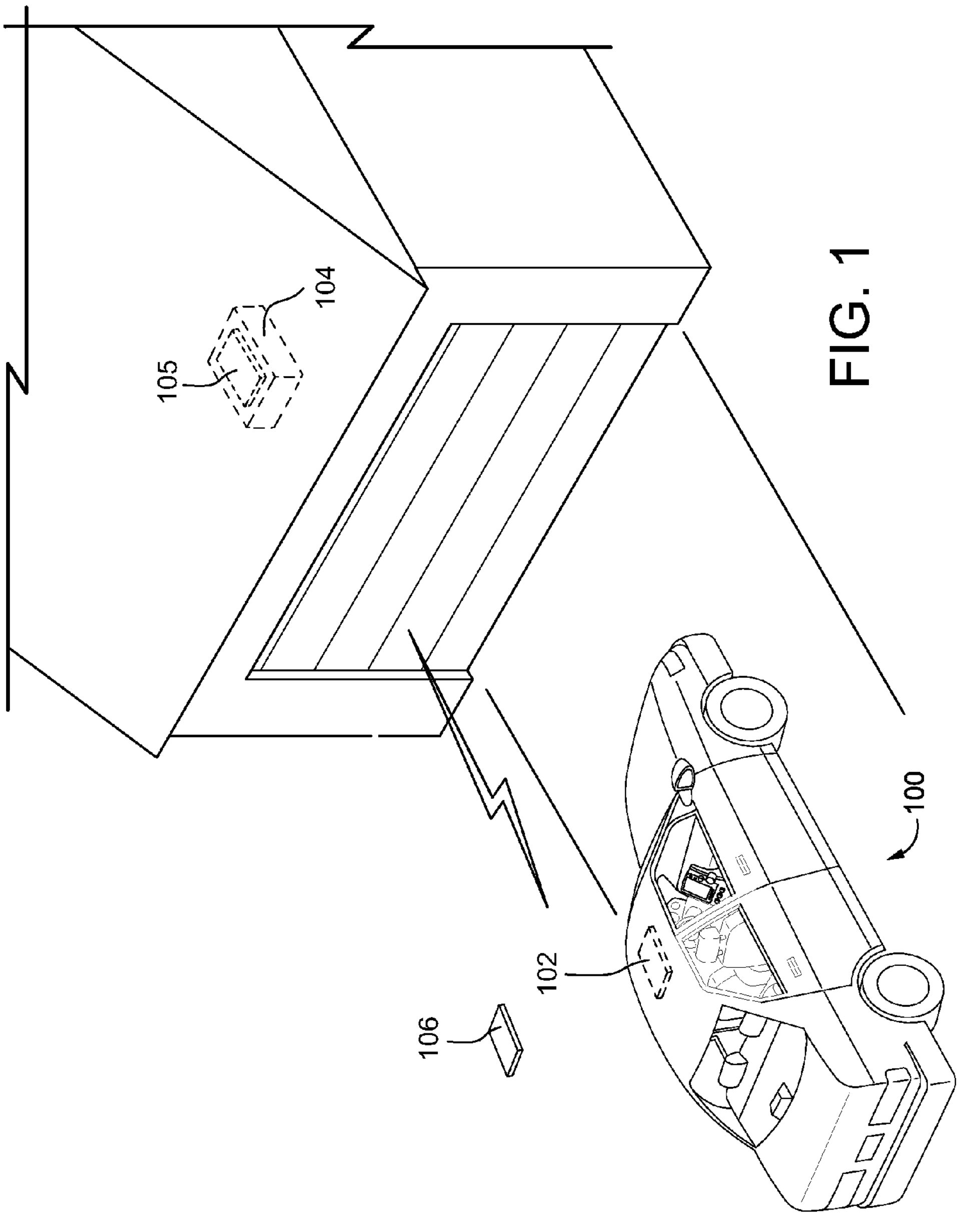
FIG. 1 is a perspective view of a vehicle having a control system configured to provide a control signal to a remote device such as a garage door opener, according to an exemplary embodiment.

Referring now to FIG. 1, a perspective view of a vehicle 100 having a control system 102 configured to provide a control signal (e.g., a formatted radio frequency (RF) signal) to a remote device 104 is shown, according to one embodiment. In the present example, control system 102 includes a trainable transmitter. In alternative embodiments, control system 102 may be embodied in other systems such as a portable housing, key fob, key chain or other hand-held device. In FIG. 1, control system 102 is illustrated as mounted to an overhead console of vehicle 100. Alternatively, one or more of the elements of control system 102 may be mounted to other vehicle interior elements such as a visor, an instrument panel, a rearview mirror, a dashboard, seat, center console, door panel, or other location in the vehicle 100.

According to the embodiment shown FIG. 1, remote device 104 is a garage door opener for opening a garage door such as the garage door illustrated in FIG. 1. Remote device 104 includes or is associated with a receiver 105 that receives the control signal and causes (e.g., via one or more signals) the garage door opener to open the garage door based on the received control signal. It should be understood that remote device 104 may include or communicate with other devices, such as a home security system, home lighting system, gate control system, etc. A receiver included or associated with the remote device, such as the garage door opener, is typically configured to cause the remote device to actuate or change states only if the control signal is determined to be from an authorized device. The receiver typically determines whether or not the control signal is from an authorized device based on characteristics of the control signal, such as the carrier frequency and control data. For example, a receiver included or associated with the remote device may be configured to cause the remote device to actuate or change state if the control signal is sent at a certain carrier frequency or frequencies, includes representations of particular codes, is formatted in a particular way, includes a certain cryptography key, is modulated a certain way, and the like.

A receiver, such as receiver 105, included or associated with a remote device, such as remote device 104, is typically associated with one or more original portable transmitters, such as portable transmitter 106, configured to provide an appropriately formatted control signal to the receiver. Portable transmitter 106 may be an original transmitter sold with remote device 104 and/or previously configured for communications with receiver 105 of remote device 104. Portable transmitter 106 may be configured to transmit a control signal at a predetermined carrier frequency and having control data configured to cause remote device 104 to actuate an object, such as a garage door, gate, etc., or otherwise cause remote device 104 to control something. In the example shown, portable transmitter 106 may include a hand-held garage door opener transmitter configured to transmit a garage door opener signal at a frequency, such as 355 Megahertz (MHz), 295 MHz, or the like, wherein the control signal has control data, which can be fixed code or cryptographically-encoded code (e.g., a rolling code or the like).

In some instances, control system 102 mounted in vehicle 100 may not be pre-configured for communications with the user's particular remote device 104 when first sold to a user (with vehicle 100 or otherwise). Vehicle control system 102 can be configured for wireless communications with remote device 104 via a one or more configuration processes (e.g., training processes, setup processes, etc.). For example, control system 102 can include a radio frequency receiver configured to receive radio frequency control signals from portable transmitter 106 and to configure control system 102 using the received radio frequency control signals. According to other embodiments, control system 102 can include a plurality of stored codes for transmitting with control signals and for actuating a plurality of different types of remote devices such as garage door openers. A training process of this type of system may rely on the control system transmitting the plurality of stored codes in a sequence to the remote device, the user indicating when he or she observes the remote device change states to the vehicle control system; the vehicle control system configuring itself based the timing of the indication (e.g., storing one or more codes associated with the timing of the indication).

Figure 2:
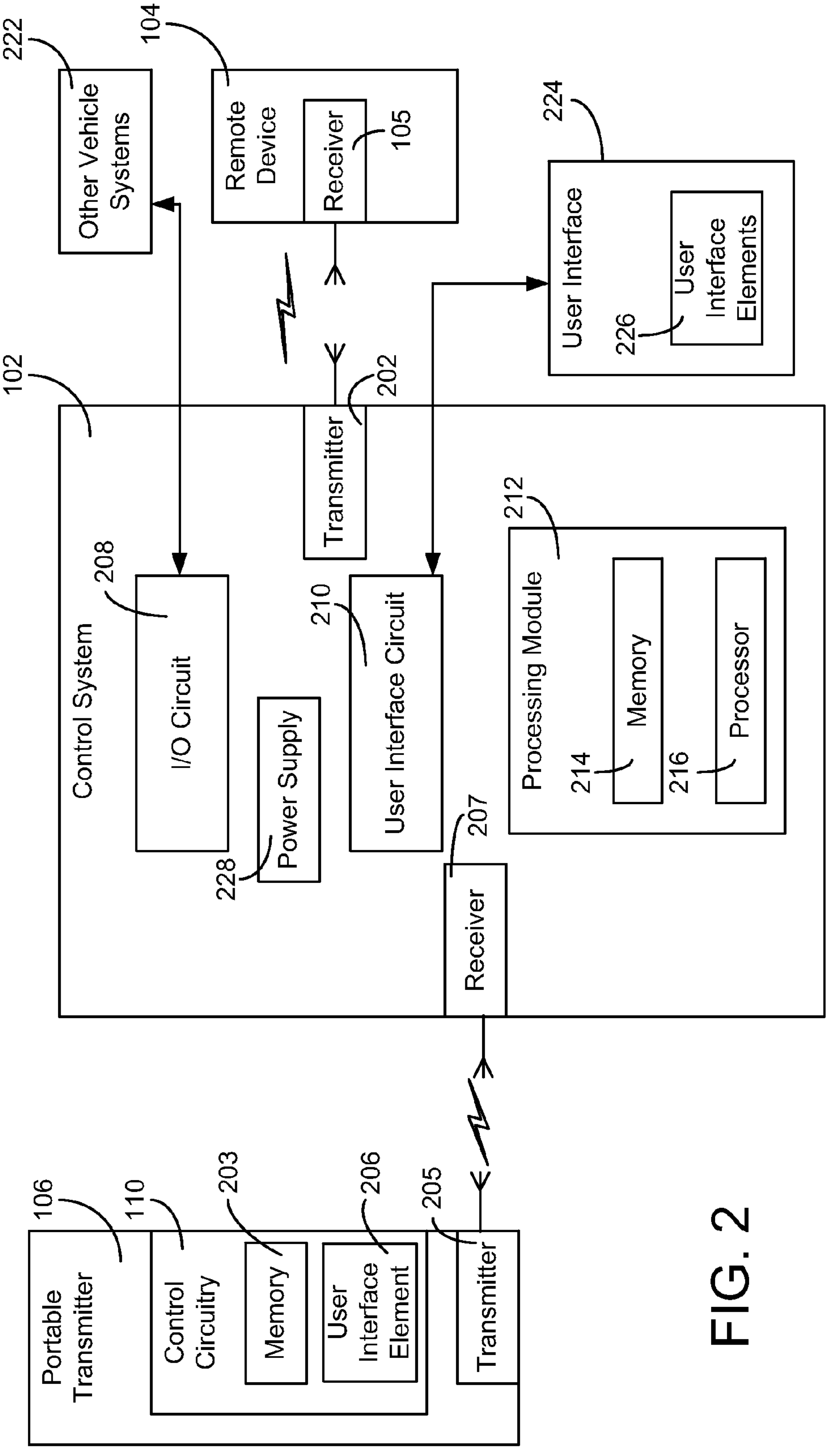
FIG. 2 is a block diagram of a system such as that illustrated in FIG. 1, according to an exemplary embodiment.

Referring now to FIG. 2, a block diagram of the system illustrated in FIG. 1 is shown, according to one embodiment. Portable transmitter 106 is shown to include control circuitry 110, a transmitter 205, a user interface element 206, and a memory 203. Receiver 207 of control system 102 may be configured to receive information from portable transmitter 106 via RF communications. Using the received information, control system 102 may configure itself for authenticated transmissions from the control system 102's transmitter 202 to remote device 104's receiver 105.

According to various embodiments, vehicle control system 102 can configure itself without reliance on information received from portable transmitter 106, such as by a "guess and test" training method. In a guess and test training method a control signal is generated by control system 102 and transmitted using transmitter 202 to remote device 104. The user then observes if remote device 104 responds to the control signal and, if so, causes control system 102 to store the settings for the previously generated control signal. Or, if no response occurs at remote device 104, the user can then cause control system 102 to generate a second control signal using different settings and to transmit the second control signal to the remote device 104. The process is repeated until the user observes remote device 104 respond or otherwise ends the guess and test training.

Control circuitry 110 of portable transmitter 106 may generally be configured to format a control signal for transmission to remote device 104 via transmitter 205 or to cause transmitter 205 to format and send the control signal. Control circuitry 110 is shown to include memory 203 for storing information such as information regarding the control signal for remote device 104 (e.g., a carrier frequency data, control data, or other data). Control circuitry 110 further includes user interface elements 206 which may be pressed or otherwise used by a user of portable transmitter 106 to transmit information. User interface elements 206 may include one or more of buttons, switches, touch-sensitive elements, voice recognition systems, touch screens, or other controls for receiving user input or providing user output.

Control system 102 is shown to include transmitter 202 (e.g., a radio frequency (RF) transmitter), I/O circuit 208, user interface circuit 210, and processing module 212. According to one embodiment, control system 102 is configured to be mounted to a vehicle such as vehicle 100 of FIG. 1 (e.g., mounted in a vehicle interior location, a center stack location, a dashboard location, a center console, an overhead console, a floor console, an instrument panel, a door panel, a visor, a rear-view mirror, a headliner location, in multiple vehicle locations, etc.).

According to an embodiment, control system 102 may be configured to transmit a control signal to receiver 105 of remote device 104 based on user input signals received from a user interface 224 at user interface circuit 210. For example, when one or more of a plurality of user interface elements 226 are pressed or otherwise interacted with by a user, user interface circuit 210 and processing module 212 may cause RF transmitter 202 to transmit a control signal associated with the pressed or activated user interface element 226. User interface elements 226 may include one or more of buttons, switches, touch-sensitive elements, voice recognition systems, touch screens, or other controls for receiving user input or providing user output. The transmission of the control signal can also be triggered based on input received from other vehicle systems 222 via I/O circuit 208. Other vehicle systems 222 may include, for example, a positioning device (e.g., GPS receiver) configured to cause RF transmitter 202 to transmit the control signal based on position information received at I/O circuit 208. Other vehicle systems 222 may also include vehicle communications systems (e.g., configured to receive data from a mobile phone, an Internet source, or otherwise), vehicle center stack control systems, voice recognition systems, body electronics modules configured to receive signals from key fobs or other remote controls, and the like that may be configured to provide signals that control or otherwise affect the behavior of control system 102.

Processing module 212 is shown to include memory 214 and processor 216. Processing module 212 may be configured to initiate and control the transmission of a control signal by controlling and/or providing information to transmitter 202. When information is received by a circuit 208 or 210, processing module 212 may be configured to store the received information in memory, to process the received information using processor 216, and/or to set variables stored in memory 214. Control system 102 is further shown to include a power supply 228 for supplying a power source to control system 102.

Processing module 212 and/or processor 216 may be or may include one or more integrated circuits, application specific integrated circuits (ASIC), general purpose processors, memory chips, logic gates, field programmable gate arrays (FPGA), and/or other electronics components for processing user input, received data communications, and/or received control signals from other components attached to processing module 212 and/or processor 216. Memory 214 may be any type of memory device, may be local to processing module 212 (as shown), remote from processing module 212, or otherwise communicably coupled to processing module 212. Memory, 214 can be or include random access memory, read only memory, and/or any other type of memory. Memory 214 can be configured to store codes for communication to various types of remote devices, algorithms for generating codes or control signals for various types of remote devices, variables for storing system or user set values, variables for storing pointers to codes to be used, constant values, transmission schemes, temporary values, receptions from an original transmitter, computer code for execution by processor 216 for executing the various processes described herein or supporting functions, or the like.

Remote device 104 generally includes a receiver 105 for receiving information regarding the use of remote device 104. For example, receiver 105 may be configured to receive a control signal commanding remote device 104 to perform an activity, such as opening a garage door. Receiver 105 can be configured to receive a narrow band of frequencies, a wide band of frequencies, communications centered around one or more frequencies, or any type of radio frequency receiver configured to receive communications from original portable transmitter 106 and/or vehicle control system 102. According to one embodiment, receiver 105 is configured to receive radio frequency communications at around 285-450 MHz, inclusive. In other implementations, receiver 105 may be configured to receive radio frequency communications at around 40 MHz, 868 MHz, 915 MHz, and/or any other frequency. Receiver 105 may also be configured to process the signals received to determine if the signals are from an authorized source or otherwise expected. For example, receiver 105 may decode or demodulate received transmissions or check decode or demodulate transmissions against a cryptographic algorithm, against a checksum, against a stored value, against a count, or against any other criteria.

Figure 5:
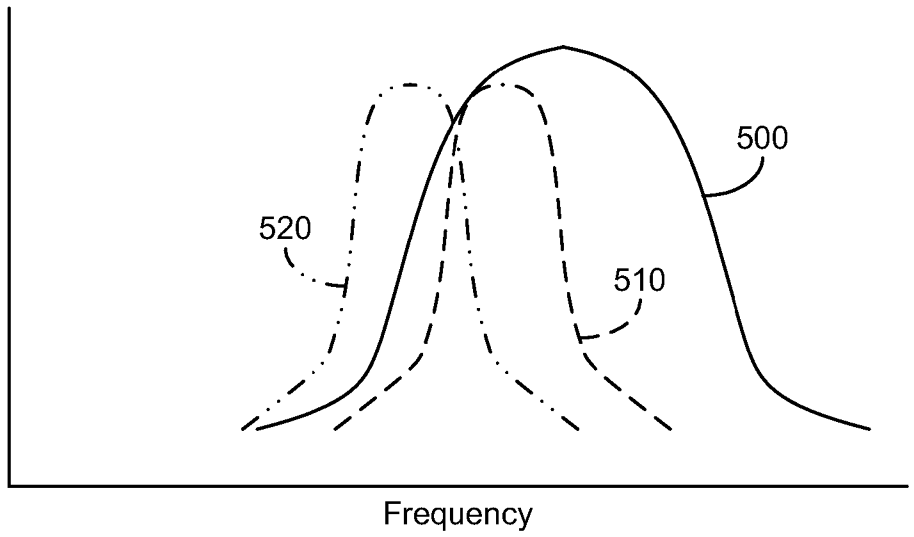
FIG. 5 is a graphical representation of a receiver carrier frequency, an original transmitter carrier frequency, and an offset trained carrier frequency, according to an exemplary embodiment.

In some instance, the control signal transmitted by control system 102 via transmitter 202 may be altered or otherwise changed from a trained control signal. For example, various RF characteristics of the control system 102 may cause the frequency of the carrier signal to be shifted from a trained frequency carrier signal. For instance, the RF characteristics may cause a frequency shift during periods when control data is modulated on the RF carrier signal. In some other situations, aging, degradation, environmental factors, manufacturing tolerances or causes, and/or other causes may result in a frequency shift when the trained carrier frequency is generated by control system 102. In still further instances, the tolerance of the trained carrier frequency may be limited in the control system. The frequency shifts may result in a wider bandwidth of the transmitted control signal (e.g., a bandwidth that was originally 294.8 MHz to 295.2 MHz may be altered to a bandwidth of 294 MHz to 296 MHz) or an offset bandwidth of the transmitted control signal (e.g., a bandwidth that was originally 294.8 MHz to 295.2 MHz may be altered to a bandwidth of 294.4 MHz to 294.8 MHz). Referring briefly to FIG. 5, an example of a receiver carrier frequency bandwidth 500, an original carrier frequency bandwidth 510, and an offset carrier frequency bandwidth 520 are shown. In some instances, the receiving bandwidth of receiver 105 associated with remote device 104 may be relatively narrow (e.g., 294.8 MHz to 295.2 MHz). Therefore, the wider bandwidth or offset bandwidth of the control signal caused by the shift in the carrier frequency may affect the performance of transmitter 202 and/or the ability of receiver 105 of remote device 104 to receive and respond to the control signal transmitted by transmitter 202 of control system 102. Of course, the foregoing example frequencies are merely to provide an example, and other frequencies or bands (e.g., 40 MHz, 315, MHz, 433 MHz, 868 MHz, 915 MHz, etc.) may be used depending on the application (e.g., garage door, security system, etc.).

Similarly, in other situations, the frequency band tolerance of receiver 105 of remote device 104 may be altered or otherwise changed from an original condition (e.g., due to aging, degradation, environmental factors, manufacturing tolerances or causes, and/or other causes). Even if the trained control signal transmitted by control system 102 via transmitted 202 has not been affected, the changes to receiver 105 and/or remote device 104 may affect the performance the ability of receiver 105 of remote device 104 to receive and respond to the control signal transmitted by transmitter 202 of control system 102. Accordingly, there is a need for a system and/or method to compensate for the foregoing matters.

Figure 3:
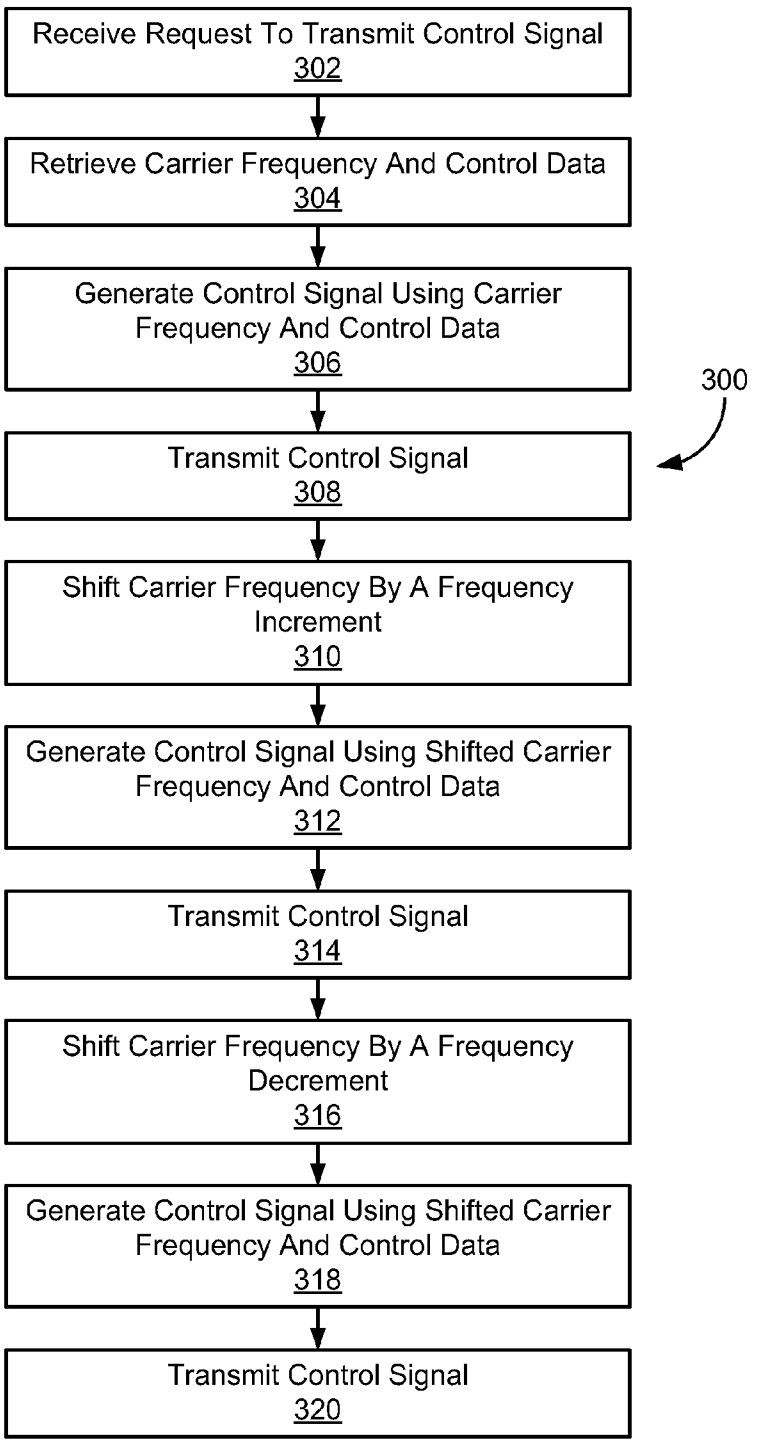
FIG. 3 is a flow diagram of a method for modifying a trained carrier frequency, according to an exemplary embodiment.

FIG. 3 depicts a method 300 for modifying a carrier frequency to address the above-described frequency shift and the like, according to an exemplary embodiment. Control system 102 may receive a request to transmit a control signal from the control system 102 to receiver 105 of remote device 104 (block 302). As noted above, control system 102 of the present example may include a trainable transmitter. The request to transmit the control signal may be received from I/O circuit 208, user interface circuit 210, receiver 207, and/or otherwise. For example, I/O circuit 208 may receive input from other vehicle systems 222. Other vehicle systems 222 may include, for example, a positioning device (e.g., GPS receiver, mobile phone having GPS capabilities, etc.) configured to cause transmitter 202 to transmit the control signal based on position information received at I/O circuit 208. Other vehicle systems 222 may also include vehicle communications systems (e.g., configured to receive data from a mobile phone, an Internet source, or otherwise), vehicle center stack control systems, voice recognition systems, body electronics modules configured to receive signals from key fobs or other remote controls, and the like that may be configured to provide signals that control or otherwise affect the behavior of control system 102. In another implementation, the request may be received from user interface circuit 210 from a user interface 224. For example, when one or more of a plurality of user interface elements 226 are pressed or otherwise interacted with by a user, the request may be received at processing module 212 from user interface circuit 210. User interface elements 226 may include one or more of buttons, switches, touch-sensitive elements, voice recognition systems, touch screens, etc. In yet another implementation, the request may be received via receiver 207. For instance, receiver 207 may receive a request from another device (not shown) having a transmitter capable of sending the request to receiver 207.

In some implementations, control system 102 may be operable to transmit multiple trained control signals. In such instances, the request may be associated with a corresponding user input (e.g., a specific pressed button, a specific voice recognition command, a specific touch-sensitive element, a specific portion of a touch screen, etc.) such that the processing module 212 may generate the corresponding control signal. Still other implementations for receiving a request to transmit a control signal may be used as well.

A trained carrier frequency and control data may be retrieved in response to the received request (block 304). For example, the trained carrier frequency and control data may be retrieved from memory 214 by processing module 212. In some instances, multiple trained carrier frequencies and/or control data may be stored in memory 214. In such instances, the retrieved trained carrier frequency and control data may be retrieved based upon an association between the received request and the stored trained carrier frequency and/or control data. While references are made herein to a trained carrier frequency and control data, it should be understood that control system 102 may include one or more pre-programmed carrier frequencies and/or control data that may be included within the terms trained carrier frequencies and/or control data herein.

A first control signal may be generated using the retrieved carrier frequency and control data (block 306). For example, processing module 212 may be configured to modulate the retrieved control data on the carrier frequency signal to generate the first control signal. The generated first control signal may be transmitted using transmitter 202 (block 308). In some implementations, the generated first control signal may be transmitted for a predetermined period of time, such as 100 milliseconds (ms), 150 ms, 200 ms, 250 ms, 300 ms, 350 ms, 400 ms, 450 ms, or 500 ms.

The carrier frequency may be shifted by a frequency increment (block 310). In some implementations, processing module 212 may shift the carrier frequency by a predetermined frequency increment retrieved from memory 214 (e.g., a fixed frequency increment may be utilized, such as 0.05 kHz, 0.1 kHz, 0.2 kHz, 0.5 kHz, 1 kHz, 1.5 kHz, 2 kHz, 2.5 kHz, 5 kHz, 10 kHz, 15 kHz, 20 kHz, 50 kHz, and/or any value in between such values, such as those in the range of 0.2 kHz, inclusive, to 1.5 kHz, inclusive, or those in the range of 2 kHz, inclusive, to 20 kHz, inclusive).

In some implementations, the frequency increment may be based, at least in part, on a manufacturer identifier. The manufacturer identifier may be determined when control system 102 is initially trained (e.g., by a separate signal from an original transmitter and/or otherwise). In other implementations, the manufacturer identifier may be determined based on the control data and/or carrier frequency (e.g., by comparison to a table of values stored locally with control system 102 and/or by control system 102 remotely accessing a table of values). Still other methods for determining a manufacturer identifier may be used as well (e.g., automated identification, an update from a manufacturer, via voice recognition, via keypad or touchscreen entries, a guess and test process, etc.).

In some other implementations, the frequency increment may be determined during the training of control system 102 and/or at any other time and stored in memory 214. For example, when control system 102 is initially trained, a frequency sweep may be performed by control system 102 to detect a characteristic (e.g., a frequency, a bandwidth of frequencies, and/or frequency peaks) of an original control signal and/or carrier frequency from another transmitter, such as portable transmitter 106. Based on the detected characteristic of the control signal and/or carrier signal, a frequency increment may be determined by control system 102 and stored in memory 214. For example, a transmitter emitting a control signal having a carrier frequency of 295 MHz with a bandwidth of 294.8 MHz to 295.2 MHz may result in control system 102 determining that a frequency increment of 0.5 kHz may be applicable based on the narrow bandwidth. In another example, a control signal having a carrier frequency of 295 MHz with a bandwidth of 294.8 MHz to 295.2 MHz and frequency peaks 294.9 MHz and 295.1 MHz may result in control system 102 determining that a frequency increment of 0.2 kHz may be applicable based on the narrow bandwidth and the frequency peaks. In some implementations, the control signal may have a carrier frequency of 40 MHz, 315 MHz, 433 MHz, 868 MHz, 915 MHz, and/or any other carrier frequency. For instance, a transmitter emitting a control signal having a carrier frequency of 433.92 MHz with a bandwidth of 432 MHz to 435 MHz may result in control system 102 determining that a frequency increment of 0.5 kHz may be applicable based on the narrow bandwidth. Of course other implementations to determine a frequency increment may be utilized as well.

A second control signal may be generated using the shifted carrier frequency and control data (block 312). For example, processing module 212 may be configured to modulate the retrieved control data on the shifted carrier frequency signal to generate the second control signal. The generated second control signal may be transmitted using transmitter 202 (block 314). In some implementations, the generated second control signal may be transmitted for a predetermined period of time, such as 100 milliseconds (ms), 150 ms, 200 ms, 250 ms, 300 ms, 350 ms, 400 ms, 450 ms, or 500 ms.

The carrier frequency may be shifted by a frequency decrement (block 316). In some implementations, processing module 212 may shift the carrier frequency by a predetermined frequency decrement retrieved from memory 214 (e.g., a fixed frequency increment may be utilized, such as 0.05 kHz, 0.1 kHz, 0.2 kHz, 0.5 kHz, 1 kHz, 1.5 kHz, 2 kHz, 2.5 kHz, 5 kHz, 10 kHz, 15 kHz, 20 kHz, 50 kHz, and/or any value in between such values, such as those in the range of 0.2 kHz, inclusive, to 1.5 kHz, inclusive, or those in the range of 2 kHz, inclusive, to 20 kHz, inclusive).

In some implementations, the frequency decrement may be based, at least in part, on a manufacturer identifier, such as that discussed in reference to block 310. Similarly, in some other implementations, the frequency decrement may be determined during the training of control system 102 and/or at any other time based on a frequency sweep, such as that discussed in reference to block 310.

A third control signal may be generated using the shifted carrier frequency and control data (block 318). For example, processing module 212 may be configured to modulate the retrieved control data on the shifted carrier frequency signal to generate the third control signal. The generated third control signal may be transmitted using transmitter 202 (block 320). In some implementations, the generated third control signal may be transmitted for a predetermined period of time, such as 100 milliseconds (ms), 150 ms, 200 ms, 250 ms, 300 ms, 350 ms, 400 ms, 450 ms, or 500 ms.

In one example configuration, control system 102 may be configured to transmit the first control signal for 200 ms, the second control signal for 200 ms, the third control signal for 200 ms, and repeat the sequence. Of course, any of the forgoing transmission periods and/or combinations thereof may be used. In some implementations, control system 102 may be configured to implement method 300 each time a request to transmit the control signal is received. In other implementations, method 300 may be initiated in response to another command (e.g., a switch being actuated to a dithering mode, a dithering mode being selected from a menu on a touch screen and/or touch-sensitive elements, holding a button down to enter a dithering mode, etc.). In some implementations, if control system 102 is located beneath a receiver 105 of a remote device 104, a null frequency may occur. Accordingly, the shifting of the carrier frequency may overcome such a null frequency such that remote device 104 may be activated.

Figure 6:
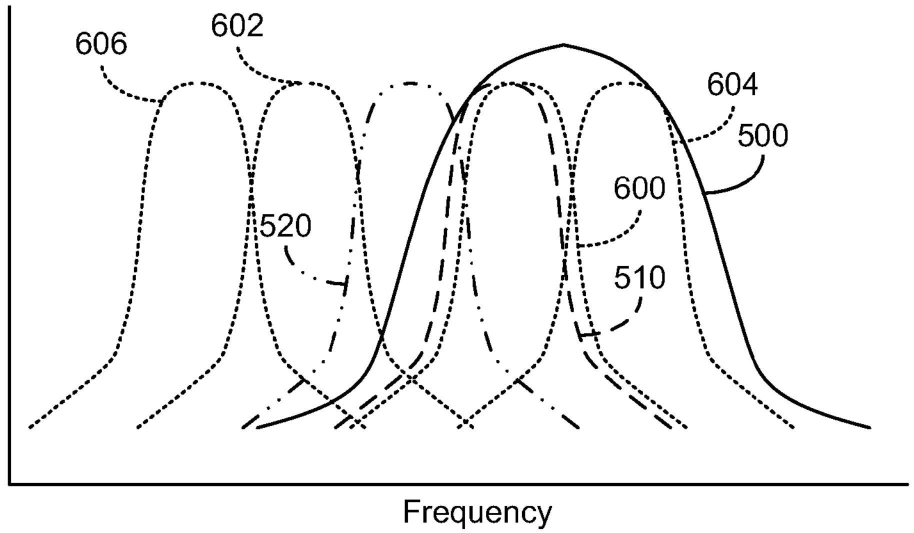
FIG. 6 is a graphical representation of a receiver carrier frequency, an original transmitter carrier frequency, an offset trained carrier frequency, and multiple shifted trained carrier frequencies, according to an exemplary embodiment.

Referring briefly to FIG. 6, an example receiver carrier frequency bandwidth 500, an original carrier frequency bandwidth 510, and an offset carrier frequency bandwidth 520 are shown. A first shifted carrier frequency bandwidth 600 may be generated when the carrier frequency is shifted by the frequency increment in accordance with block 310 of method 300 described above. Similarly, a second shifted carrier frequency bandwidth 602 may be generated when the carrier frequency is shifted by the frequency decrement in accordance with block 316 of method 300 described above. Of course, the foregoing is merely an example.

Figure 4:
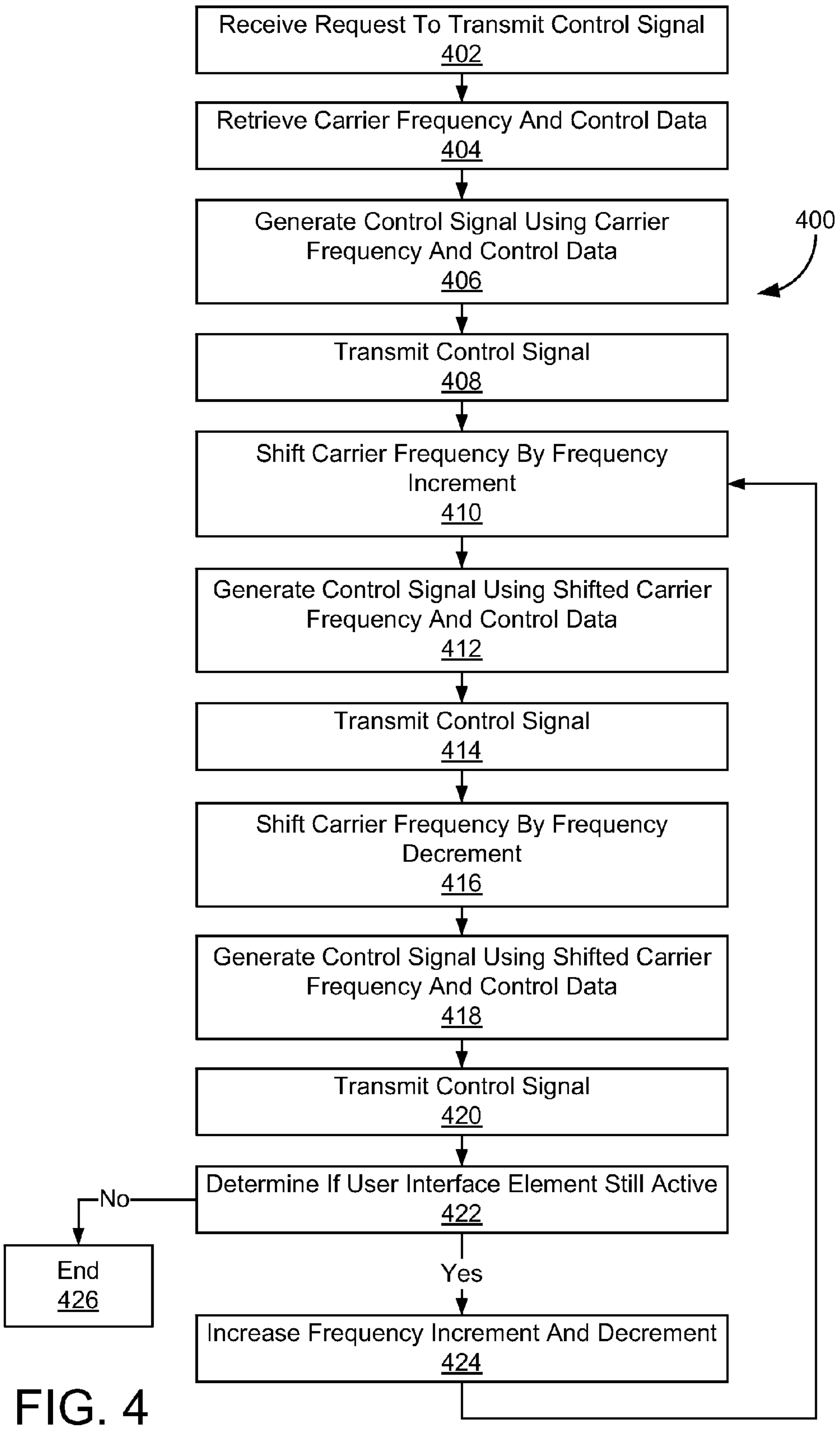
FIG. 4 is a flow diagram of another method for modifying a trained carrier frequency, according to an exemplary embodiment.

FIG. 4 depicts another example method 400 for modifying a carrier frequency that may be implemented with control system 102. Control system 102 may receive a request to transmit a control signal from the control system 102 to receiver 105 of remote device 104 (block 402). As noted above, control system 102 of the present example may include a trainable transmitter. The request to transmit the control signal may be received from I/O circuit 208, user interface circuit 210, receiver 207, and/or otherwise. The control signal may be received by the I/O circuit 208, user interface circuit 210, receiver 207, and/or otherwise in accordance with at least some of the teachings described in reference to block 302 of FIG. 3.

In some implementations, control system 102 may be operable to transmit multiple trained control signals. In such instances, the request may be associated with a corresponding user input (e.g., a specific pressed button, a specific voice recognition command, a specific touch-sensitive element, a specific portion of a touch screen, etc.) such that the processing module 212 may generate the corresponding control signal. Still other implementations for receiving a request to transmit a control signal may be used as well.

A trained carrier frequency and control data may be retrieved in response to the received request (block 404). For example, the trained carrier frequency and control data may be retrieved from memory 214 by processing module 212. In some instances, multiple trained carrier frequencies and/or control data may be stored in memory 214. In such instances, the retrieved trained carrier frequency and control data may be retrieved based upon an association between the received request and the stored trained carrier frequency and/or control data. While references are made herein to a trained carrier frequency and control data, it should be understood that control system 102 may include one or more pre-programmed carrier frequencies and/or control data that may be included within the terms trained carrier frequencies and/or control data herein.

A first control signal may be generated using the retrieved carrier frequency and control data (block 406). For example, processing module 212 may be configured to modulate the retrieved control data on the carrier frequency signal to generate the first control signal. The generated first control signal may be transmitted using transmitter 202 (block 408). In some implementations, the generated first control signal may be transmitted for a predetermined period of time, such as 100 milliseconds (ms), 150 ms, 200 ms, 250 ms, 300 ms, 350 ms, 400 ms, 450 ms, or 500 ms.

The carrier frequency may be shifted by a frequency increment (block 410). In some implementations, processing module 212 may shift the carrier frequency by a predetermined frequency increment retrieved from memory 214 (e.g., a fixed frequency increment may be utilized, such as 0.05 kHz, 0.1 kHz, 0.2 kHz, 0.5 kHz, 1 kHz, 1.5 kHz, 2 kHz, 2.5 kHz, 5 kHz, 10 kHz, 15 kHz, 20 kHz, 50 kHz, and/or any value in between such values, such as those in the range of 0.2 kHz, inclusive, to 1.5 kHz, inclusive, or those in the range of 2 kHz, inclusive, to 20 kHz, inclusive).

In some implementations, the frequency increment may be based, at least in part, on a manufacturer identifier. The manufacturer identifier may be determined when control system 102 is initially trained (e.g., by a separate signal and/or otherwise). In other implementations, the manufacturer identifier may be determined based on the control data and/or carrier frequency (e.g., by comparison to a table of values stored locally with control system 102 and/or by control system 102 remotely accessing a table of values). Still other methods for determining a manufacturer identifier may be used as well.

In some other implementations, the frequency increment may be determined during the training of control system 102 and/or at any other time and stored in memory 214. For example, when control system 102 is initially trained, a frequency sweep may be performed by control system 102 to detect a characteristic (e.g., a frequency, a bandwidth of frequencies, and/or frequency peaks) of an original control signal and/or carrier frequency from another transmitter, such as portable transmitter 106. Based on the detected characteristic of the control signal and/or carrier signal, a frequency increment may be determined by control system 102 and stored in memory 214. For example, a transmitter emitting a control signal having a carrier frequency of 295 MHz with a bandwidth of 294.8 MHz to 295.2 MHz may result in control system 102 determining that a frequency increment of 0.5 kHz may be applicable based on the narrow bandwidth. In another example, a control signal having a carrier frequency of 295 MHz with a bandwidth of 294.8 MHz to 295.2 MHz and frequency peaks 294.9 MHz and 295.1 MHz may result in control system 102 determining that a frequency increment of 0.2 kHz may be applicable based on the narrow bandwidth and the frequency peaks. In some implementations, the control signal may have a carrier frequency of 40 MHz, 315 MHz, 433 MHz, 868 MHz, 915 MHz, and/or any other carrier frequency. Of course other implementations to determine a frequency increment may be utilized as well.

As will be discussed in greater detail herein, the frequency increment may be modified during implementation of method 400. For example, the frequency increment may be doubled, tripled, quadrupled, quintupled, etc. and/or adjusted by any other value (e.g., by an increment or decrement of 0.05 kHz, 0.1 kHz, 0.2 kHz, 0.5 kHz, 1 kHz, 1.5 kHz, 2 kHz, 2.5 kHz, 5 kHz, 10 kHz, 15 kHz, 20 kHz, 50 kHz, etc.). Thus, for subsequent iterations, the shift of carrier frequency by the frequency increment (block 410) may be different than the value of the frequency increment described above.

A second control signal may be generated using the shifted carrier frequency and control data (block 412) (or a fourth control signal, sixth control signal, etc. for subsequent iterations). For example, processing module 212 may be configured to modulate the retrieved control data on the shifted carrier frequency signal to generate the second control signal. The generated second control signal may be transmitted using transmitter 202 (block 414). In some implementations, the generated second control signal may be transmitted for a predetermined period of time, such as 100 milliseconds (ms), 150 ms, 200 ms, 250 ms, 300 ms, 350 ms, 400 ms, 450 ms, or 500 ms.

The carrier frequency may be shifted by a frequency decrement (block 416). In some implementations, processing module 212 may shift the carrier frequency by a predetermined frequency decrement retrieved from memory 214 (e.g., a fixed frequency increment may be utilized, such as 0.05 kHz, 0.1 kHz, 0.2 kHz, 0.5 kHz, 1 kHz, 1.5 kHz, 2 kHz, 2.5 kHz, 5 kHz, 10 kHz, 15 kHz, 20 kHz, 50 kHz, and/or any value in between such values, such as those in the range of 0.2 kHz, inclusive, to 1.5 kHz, inclusive, or those in the range of 2 kHz, inclusive, to 20 kHz, inclusive).

In some implementations, the frequency decrement may be based, at least in part, on a manufacturer identifier, such as that discussed in reference to block 410. Similarly, in some other implementations, the frequency decrement may be determined during the training of control system 102 and/or at any other time based on a frequency sweep, such as that discussed in reference to block 410.

As will be discussed in greater detail herein, the frequency decrement may be modified during implementation of method 400. For example, the frequency decrement may be doubled, tripled, quadrupled, quintupled, etc. and/or adjusted by any other value (e.g., by an increment or decrement of 0.05 kHz, 0.1 kHz, 0.2 kHz, 0.5 kHz, 1 kHz, 1.5 kHz, 2 kHz, 2.5 kHz, 5 kHz, 10 kHz, 15 kHz, 20 kHz, 50 kHz, etc.). Thus, for subsequent iterations, the shift of carrier frequency by the frequency decrement (block 416) may be different than the value of the frequency decrement described above.

A third control signal may be generated using the shifted carrier frequency and control data (block 418) (or a fifth control signal, seventh control signal, etc. for subsequent iterations). For example, processing module 212 may be configured to modulate the retrieved control data on the shifted carrier frequency signal to generate the third control signal. The generated third control signal may be transmitted using transmitter 202 (block 420). In some implementations, the generated third control signal may be transmitted for a predetermined period of time, such as 100 milliseconds (ms), 150 ms, 200 ms, 250 ms, 300 ms, 350 ms, 400 ms, 450 ms, or 500 ms.

A determination may be made if a user interface element of the user interface elements 226 (e.g., a button, a switch, a touch-sensitive element, a portion of a touch screen, etc.) is still active (block 422). For example, a user may still be pressing a button, switch, touch sensitive element, portion of a touch screen and/or other user interface element if remote device 104 has not been activated by control system 102 even after the foregoing control signals have been transmitted. If the determination is made that the user interface element is still active, then a modification to the frequency increment and/or decrement may be made (block 424). For example, the frequency increment and/or decrement may be doubled, tripled, quadrupled, quintupled, etc. and/or adjusted by any other value (e.g., by an increment or decrement of 0.05 kHz, 0.1 kHz, 0.2 kHz, 0.5 kHz, 1 kHz, 1.5 kHz, 2 kHz, 2.5 kHz, 5 kHz, 10 kHz, 15 kHz, 20 kHz, 50 kHz, etc.). Once the frequency increment and/or decrement have been modified, method 400 may return to block 410 with the new frequency increment and/or decrement and proceed through the shifting of the carrier frequency. By way of example only, the frequency increment and/or decrement may initially be double the original frequency increment and/or decrement (e.g., $2\Delta f$), triple the original frequency increment and/or decrement (e.g., $3\Delta f$) after the first iteration, quadruple the original frequency increment and/or decrement (e.g., 4Δf) after the second iteration, etc. Thus, the frequency increment and/or decrement may be increased incrementally the longer a user continues to keep the user interface element active. Once the determination is made that the user interface element is no longer active at block 422, the method may end (block 426).

In one example configuration, control system 102 may be configured to transmit the first control signal for 200 ms, the second control signal for 200 ms, the third control signal for 200 ms, the fourth control signal for 200 ms, the fifth control signal for 200 ms, etc. Of course, any of the forgoing transmission periods and/or combinations thereof may be used. In some implementations, control system 102 may be configured to implement method 400 each time a request to transmit the control signal is received. In other implementations, method 400 may be initiated in response to another command (e.g., a switch being actuated to a dithering mode, a dithering mode being selected from a menu on a touch screen and/or touch-sensitive elements, holding a button down to enter a dithering mode, etc.). In some implementations, once the determination is made that the user interface element is no longer active in accordance with block 422, the current frequency increment and/or decrement values may be stored in memory 214. Thus, when method 400 is implemented again, the new frequency increment and/or decrement values may be used instead of cycling through increments of frequency increment and/or decrement values.

Referring briefly to FIG. 6, an example receiver carrier frequency bandwidth 500, an original carrier frequency bandwidth 510, and an offset carrier frequency bandwidth 520 are shown. A first shifted carrier frequency bandwidth 600 may be generated when the carrier frequency is shifted by the frequency increment in accordance with block 410 of method 400 described above. Similarly, a second shifted carrier frequency bandwidth 602 may be generated when the carrier frequency is shifted by the frequency decrement in accordance with block 416 of method 400 described above. In the example shown, the original frequency increment and decrement are doubled for the subsequent iteration, resulting in a third shifted carrier frequency bandwidth 604 that may be generated when the carrier frequency is shifted by the new frequency increment in accordance with block 410 and a fourth shifted carrier frequency bandwidth 606 that may be generated when the carrier frequency is shifted by the new frequency decrement in accordance with block 416 of method 400 described above. Of course, the foregoing is merely an example.

Figure 7:
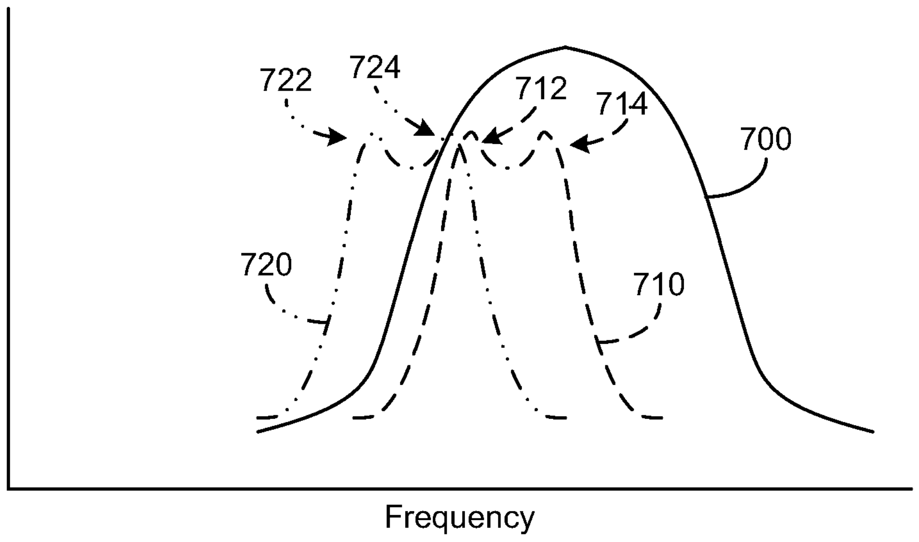
FIG. 7 is a graphical representation of another receiver carrier frequency, another original transmitter carrier frequency, and another offset trained carrier frequency, according to an exemplary embodiment.

FIG. 7 depicts a graphical representation of an example receiver carrier frequency bandwidth 700, an original carrier frequency bandwidth 710 having a first peak 712 and a second peak 714, and an offset carrier frequency bandwidth 720 having a first peak 722 and a second peak 724 for example purposes.

Figure 8:
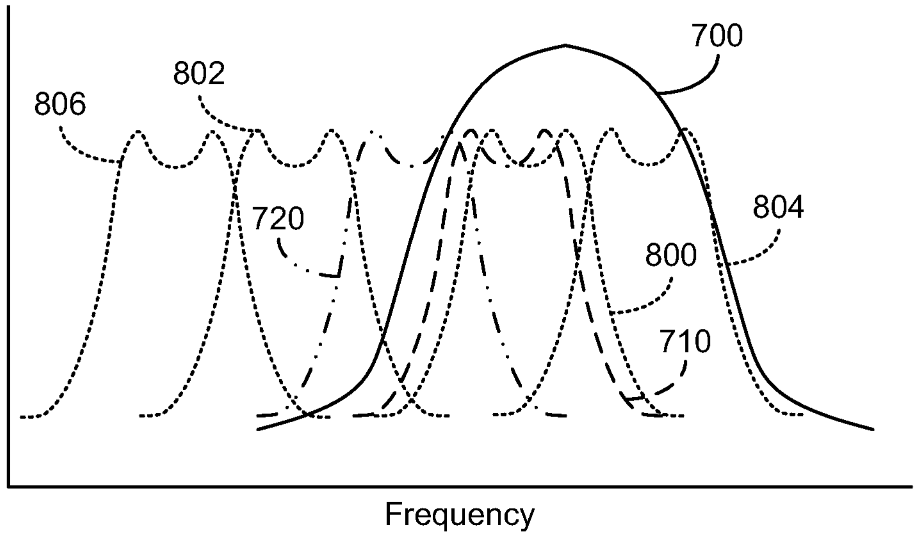
FIG. 8 is a graphical representation of another example receiver carrier frequency, another example original transmitter carrier frequency, another example offset trained carrier frequency, and examples of multiple shifted trained carrier frequencies, according to an exemplary embodiment.

FIG. 8 depicts the example receiver carrier frequency bandwidth 700, the original carrier frequency bandwidth 710, and the offset carrier frequency bandwidth 720. A first shifted carrier frequency bandwidth 800 may be generated when the carrier frequency is shifted by the frequency increment in accordance with block 310 of method 300 or in accordance with block 410 of method 400 described above. Similarly, a second shifted carrier frequency bandwidth 802 may be generated when the carrier frequency is shifted by the frequency decrement in accordance with block 316 of method 300 or in accordance with block 416 of method 400 described above. In the example shown, the original frequency increment and decrement are doubled for the subsequent iteration, resulting in a third shifted carrier frequency bandwidth 804 that may be generated when the carrier frequency is shifted by the new frequency increment in accordance with block 410 and a fourth shifted carrier frequency bandwidth 806 that may be generated when the carrier frequency is shifted by the new frequency decrement in accordance with block 416 of method 400 described above. Of course, the foregoing is also merely an example.

Figure 9:
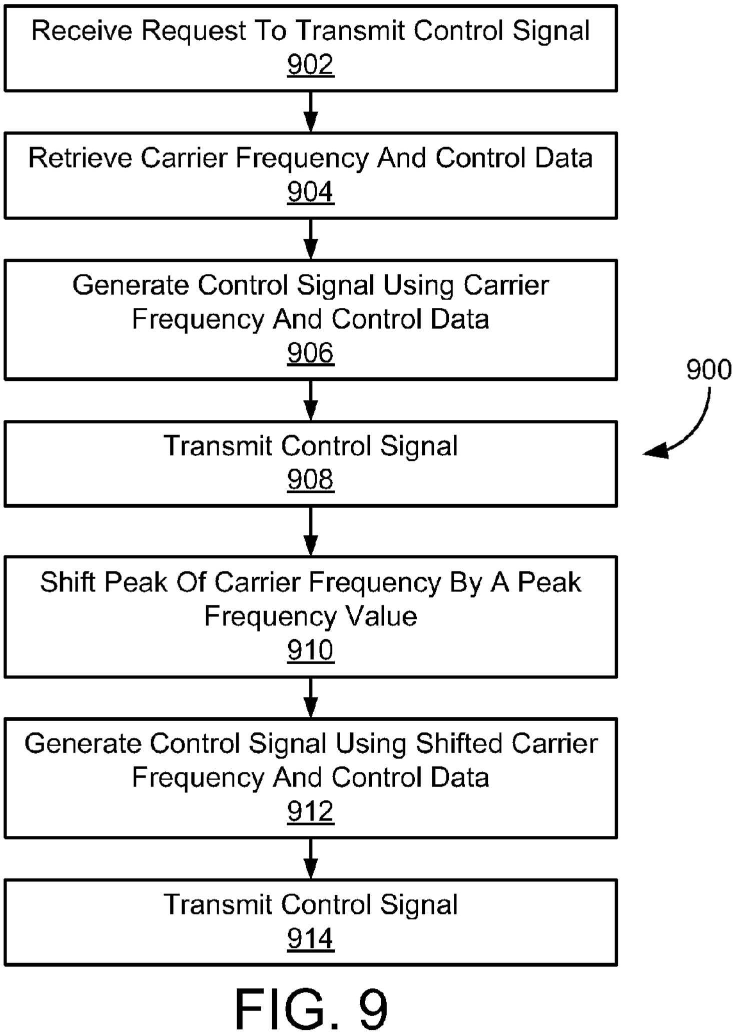
FIG. 9 is a flow diagram of yet another example method for modifying a trained carrier frequency, according to an exemplary embodiment.

FIG. 9 depicts another example method 900 for modifying a carrier frequency that may be implemented with control system 102. Control system 102 may receive a request to transmit a control signal from the control system 102 to receiver 105 of remote device 104 (block 902). As noted above, control system 102 of the present example may include a trainable transmitter. The request to transmit the control signal may be received from I/O circuit 208, user interface circuit 210, receiver 207, and/or otherwise. The control signal may be received by the I/O circuit 208, user interface circuit 210, receiver 207, and/or otherwise in accordance with at least some of the teachings described in reference to block 302 of FIG. 3.

In some implementations, control system 102 may be operable to transmit multiple trained control signals. In such instances, the request may be associated with a corresponding user input (e.g., a specific pressed button, a specific voice recognition command, a specific touch-sensitive element, a specific portion of a touch screen, etc.) such that the processing module 212 may generate the corresponding control signal. Still other implementations for receiving a request to transmit a control signal may be used as well.

A trained carrier frequency and control data may be retrieved in response to the received request (block 904). For example, the trained carrier frequency and control data may be retrieved from memory 214 by processing module 212. In some instances, multiple trained carrier frequencies and/or control data may be stored in memory 214. In such instances, the retrieved trained carrier frequency and control data may be retrieved based upon an association between the received request and the stored trained carrier frequency and/or control data. While references are made herein to a trained carrier frequency and control data, it should be understood that control system 102 may include one or more pre-programmed carrier frequencies and/or control data that may be included within the terms trained carrier frequencies and/or control data herein.

A first control signal may be generated using the retrieved carrier frequency and control data (block 906). For example, processing module 212 may be configured to modulate the retrieved control data on the carrier frequency signal to generate the first control signal. The generated first control signal may be transmitted using transmitter 202 (block 908). In some implementations, the generated first control signal may be transmitted for a predetermined period of time, such as 100 milliseconds (ms), 150 ms, 200 ms, 250 ms, 300 ms, 350 ms, 400 ms, 450 ms, or 500 ms.

A peak of the carrier frequency may be shifted by a peak frequency value (block 910). The peak frequency value may be an increment or a decrement. In some implementations, processing module 212 may shift a peak of the carrier frequency by a predetermined peak frequency value retrieved from memory 214 (e.g., a fixed frequency value may be utilized, such as 0.001 kHz, 0.005 kHz, 0.01 kHz, 0.05 kHz, 0.1 kHz, 0.2 kHz, 0.5 kHz, 1 kHz, 1.5 kHz, 2 kHz, 2.5 kHz, 5 kHz, 10 kHz, 15 kHz, 20 kHz, 50 kHz, and/or any value in between such values, such as those in the range of 0.2 kHz, inclusive, to 1.5 kHz, inclusive, or those in the range of 2 kHz, inclusive, to 20 kHz, inclusive).

In some implementations, the peak frequency value may be based, at least in part, on a manufacturer identifier. The manufacturer identifier may be determined when control system 102 is initially trained (e.g., by a separate signal and/or otherwise). In other implementations, the manufacturer identifier may be determined based on the control data and/or carrier frequency (e.g., by comparison to a table of values stored locally with control system 102 and/or by control system 102 remotely accessing a table of values). Still other methods for determining a manufacturer identifier may be used as well.

In some other implementations, the peak frequency value may be determined during the training of control system 102 and/or at any other time and stored in memory 214. For example, when control system 102 is initially trained, a frequency sweep may be performed by control system 102 to detect a characteristic (e.g., a frequency, a bandwidth of frequencies, and/or frequency peaks) of an original control signal and/or carrier frequency from another transmitter, such as portable transmitter 106. Based on the detected characteristic of the control signal and/or carrier signal, a frequency increment may be determined by control system 102 and stored in memory 214. For example, a control signal having a carrier frequency of 295 MHz and frequency peaks at 294.9 MHz and 295.1 MHz may result in control system 102 determining that a peak frequency value of 0.005 kHz may be applicable based on the frequency peaks. Of course other implementations to determine a peak frequency value may be utilized as well.

A second control signal may be generated using the shifted carrier frequency and control data (block 912). For example, processing module 212 may be configured to modulate the retrieved control data on the shifted carrier frequency signal to generate the second control signal. The generated second control signal may be transmitted using transmitter 202 (block 914). In some implementations, the generated second control signal may be transmitted for a predetermined period of time, such as 100 milliseconds (ms), 150 ms, 200 ms, 250 ms, 300 ms, 350 ms, 400 ms, 450 ms, or 500 ms.

In some implementations, control system 102 may be configured to implement method 900 each time a request to transmit the control signal is received. In other implementations, method 900 may be initiated in response to another command (e.g., a switch being actuated to a peak adjustment mode, a peak adjustment mode being selected from a menu on a touch screen and/or touch-sensitive elements, holding a button down to enter a peak adjustment mode, etc.). In further implementations, the peak (left or right) may be selected for adjustment. In some implementations a first peak, a second peak, and/or both peaks may be shifted.

Figure 10:
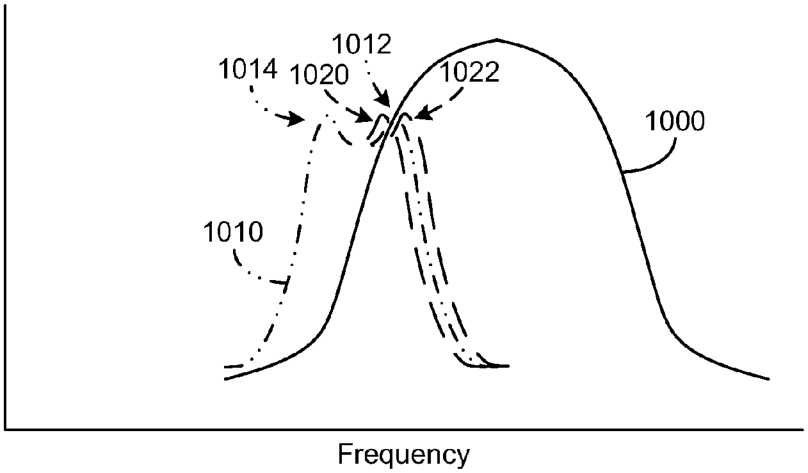
FIG. 10 is a graphical representation of an example receiver carrier frequency, an example offset trained carrier frequency, and examples of an offset peak of the offset trained carrier frequency, according to an exemplary embodiment.

FIG. 10 depicts an example receiver carrier frequency bandwidth 1000 and an offset carrier frequency bandwidth 1010 having a first peak 1012 and a second peak 1014. A portion of a shifted carrier frequency having a first peak increment 1022 may be generated when the first peak 1012 is shifted by an increment peak frequency value in accordance with block 910 of method 900 described above. Similarly, a portion of a shifted carrier frequency having a first peak decrement 1020 may be generated when the first peak 1012 is shifted by a decrement peak frequency value in accordance with block 910 of method 900 described above.

In some implementations, aspects of method 900 may be combined with method 300 and/or method 400 described herein. For example, a first control signal may be generated and transmitted using the retrieved carrier frequency and control data, a first peak of the carrier frequency may be incremented by the peak frequency value and a second control signal may be generated and transmitted using the shifted carrier frequency and control data, the carrier frequency may be shifted by a frequency increment and a third control signal may be generated and transmitted using the new shifted carrier frequency and control data, the first peak of the carrier frequency may be decremented by the peak frequency value and a fourth control signal may be generated and transmitted using the shifted carrier frequency and control data, etc. Thus, the carrier frequency and carrier peaks may be incremented and/or decremented across a range of combinations of carrier frequencies and/or carrier peaks.

Figure 11:
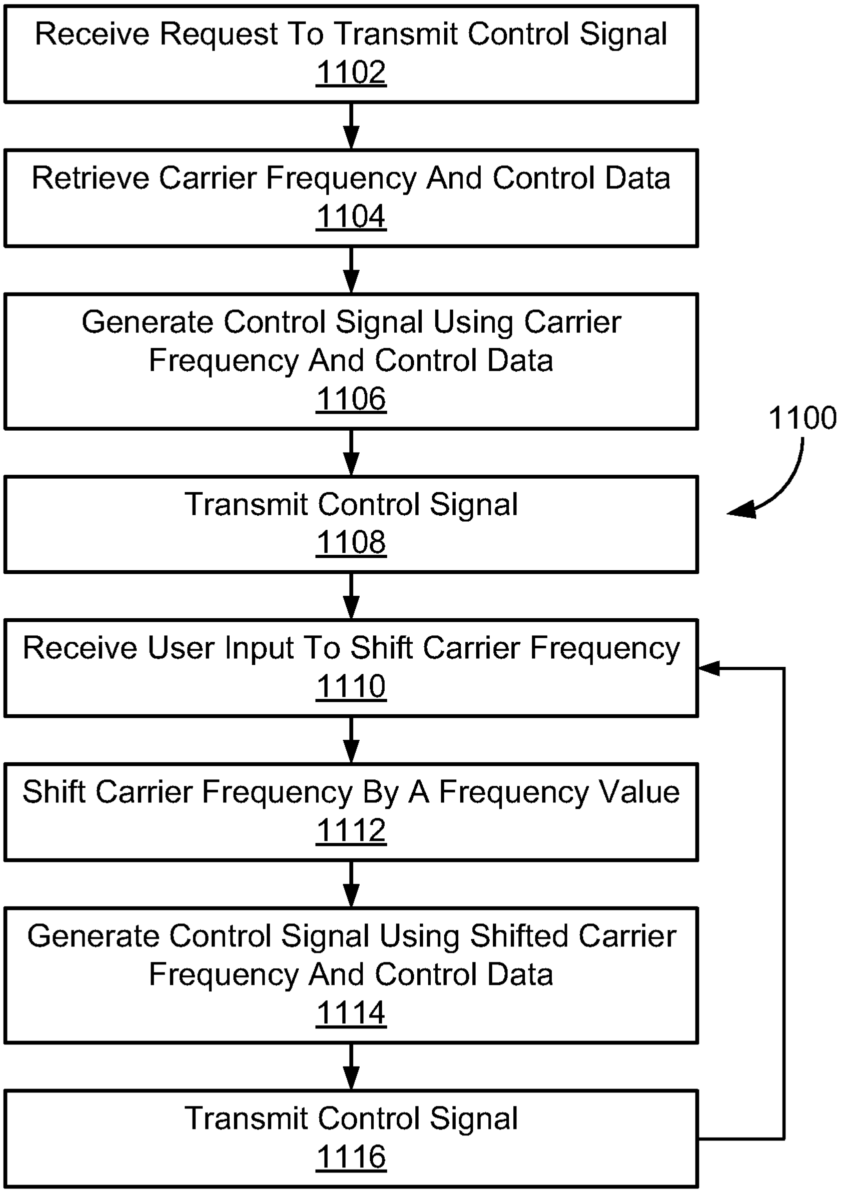
FIG. 11 is a flow diagram of still another example method for modifying a trained carrier frequency, according to an exemplary embodiment.

FIG. 11 depicts still another method 1100 for modifying a carrier frequency that may be implemented with control system 102. In the present example, control system 102 may receive a request to transmit a control signal from the control system 102 to receiver 105 of remote device 104 (block 1102). As noted above, control system 102 of the present example may include a trainable transmitter. The request to transmit the control signal may be received from I/O circuit 208, user interface circuit 210, receiver 207, and/or otherwise. The control signal may be received by the I/O circuit 208, user interface circuit 210, receiver 207, and/or otherwise in accordance with at least some of the teachings described in reference to block 302 of FIG. 3.

In some implementations, control system 102 may be operable to transmit multiple trained control signals. In such instances, the request may be associated with a corresponding user input (e.g., a specific pressed button, a specific voice recognition command, a specific touch-sensitive element, a specific portion of a touch screen, etc.) such that the processing module 212 may generate the corresponding control signal. Still other implementations for receiving a request to transmit a control signal may be used as well.

A trained carrier frequency and control data may be retrieved in response to the received request (block 1104). For example, the trained carrier frequency and control data may be retrieved from memory 214 by processing module 212. In some instances, multiple trained carrier frequencies and/or control datas may be stored in memory 214. In such instances, the retrieved trained carrier frequency and control data may be retrieved based upon an association between the received request and the stored trained carrier frequency and/or control data. While references are made herein to a trained carrier frequency and control data, it should be understood that control system 102 may include one or more pre-programmed carrier frequencies and/or control data that may be included within the terms trained carrier frequencies and/or control data herein.

A first control signal may be generated using the retrieved carrier frequency and control data (block 1106). For example, processing module 212 may be configured to modulate the retrieved control data on the carrier frequency signal to generate the first control signal. The generated first control signal may be transmitted using transmitter 202 (block 1108). In some implementations, the generated first control signal may be transmitted for a predetermined period of time, such as 100 milliseconds (ms), 150 ms, 200 ms, 250 ms, 300 ms, 350 ms, 400 ms, 450 ms, or 500 ms.

Control system 102 may then await further user input after the first control signal is transmitted, such as in a fine-tuning mode. User input may be received to shift the carrier frequency (block 1110). In some implementations, the user input may indicate an increment or decrement (e.g., actuating a first button for an increment, actuating a second button for a decrement, actuating a first switch for an increment, actuating a second switch for a decrement, activating a first touch sensitive element for an increment, activating a first touch sensitive element for a decrement, touching a first portion of a touch screen for an increment, touching a second portion of a touch screen for a decrement, a first voice command for an increment, a second voice command for a decrement, etc.). In some implementations, the user input may indicate a shift in the carrier frequency, a shift in the first peak of the carrier frequency, and/or a shift in the second peak of the carrier frequency (e.g., by utilizing multiple buttons, switches, touch-sensitive elements, portions of a touch screen, voice commands, and/or otherwise).

The carrier frequency, first peak, and/or second peak may be shifted by a frequency value (block 1112). The frequency value may be based on the user input (e.g., if a first button is pressed, then a frequency increment is applied; if a second button is pressed, then a frequency decrement is applied, etc.). In some instances, the frequency value may also be indicated through any of the foregoing user interface elements described herein and/or combinations thereof. In some implementations, a preset frequency value may be applied through a predetermined range such that the control system 102 may cycle through the range using the incremental frequency values (e.g., in 0.1 kHz increments through a −2.5 kHz to +2.5 kHz range, etc.).

A second control signal may be generated based on the shifted carrier frequency and control data (block 1114). For example, processing module 212 may be configured to modulate the shifted control data on the carrier frequency signal to generate the second control signal. The generated second control signal may be transmitted using transmitter 202 (block 1116). In some implementations, the generated second control signal may be transmitted for a predetermined period of time, such as 100 milliseconds (ms), 150 ms, 200 ms, 250 ms, 300 ms, 350 ms, 400 ms, 450 ms, or 500 ms.

Method 1100 may then return to block 1110 to increment through another frequency value for the carrier frequency, first peak, and/or second peak. In some implementations, a user input may be used to end method 1100, such as pressing and holding a button, pressing and holding a switch, selecting a touch-sensitive element, selecting a portion of a touch screen, saying a voice command, etc. In some instances, the shifted carrier frequency may be stored in memory 214 for subsequent usage.

In some implementations, method 1100 may initially be applied to the carrier frequency, then to the first peak, and then to the second peak to cycle through fine tuning of the carrier frequency. In other implementations, method 1100 may be implemented after a guess and test training to further refine the carrier frequency for usage with remote device 104. Such fine tuning may improve the range of control system 102 relative to remote device 104 (e.g., a tuned carrier frequency may activate remote device from further away). Of course, further implementations of method 1100 may be utilized, either with methods 300, 400, 900 described herein and/or otherwise.

It should be understood that although a control system 102 may be described herein with reference to systems for trainable transmitters, one or more of the systems and methods for compensating for frequency shifting may be applied to, and find utility in, other types of transmitters as well. For example, one or more of the systems for compensating for frequency shifting may be suitable for use with fixed code transmitters, single frequency transmitters, etc., all of which may require some form of compensation for frequency shifting.

While the exemplary embodiments illustrated in the figures and described above are presently preferred, it should be understood that these embodiments are offered by way of example only. Describing the invention with figures should not be construed as imposing on the invention any limitations that may be present in the figures. The present invention contemplates methods, systems and program products on various alternative embodiments. For example, alternative embodiments may be suitable for use in the commercial market, wherein office lights or security systems or parking garage doors are controlled. Accordingly, the present invention is not limited to a particular embodiment, but extends to various modifications that nevertheless fall within the scope of the appended claims.

It should be noted that although the diagrams herein may show a specific order of method steps, it is understood that the order of these steps may differ from what is depicted. Also two or more steps may be performed concurrently or with partial concurrence. Such variation will depend on the embodiment of the control system and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for modifying a trained carrier frequency for a trainable transmitter comprising:

receiving a request to transmit a control signal from the trainable transmitter to a receiver, the request being generated in response to an activation of a user input;

transmitting a first control signal using the trained carrier frequency and a control data;

shifting at least part of the trained carrier frequency by a first frequency increment;

transmitting a second control signal using the trained carrier frequency shifted by the first frequency increment and the control data;

shifting at least part of the trained carrier frequency by a first frequency decrement;

transmitting a third control signal using the trained carrier frequency shifted by the first frequency decrement and the control data;

determining whether the user input is still activated;

shifting at least part of the trained carrier frequency by a second frequency increment, wherein the second frequency increment is greater than the first frequency increment;

transmitting a fourth control signal using the trained carrier frequency shifted by the second frequency increment and the control data;

shifting at least part of the trained carrier frequency by a second frequency decrement, wherein the second frequency decrement is greater than the first frequency decrement; and transmitting a fifth control signal using the trained carrier frequency shifted by the second frequency decrement and the control data.

2. The method of claim 1 further comprising:

prior to determining whether the user input is still activated, shifting at least part of the trained carrier frequency by a third frequency increment; and transmitting a sixth control signal using the trained carrier frequency shifted by the third frequency increment and the control data.

3. The method of claim 1, wherein the shifting of at least part of the trained carrier frequency by the first frequency increment and the shifting at least part of the trained carrier frequency by the first frequency decrement occur each time a request to transmit the control signal from the trainable transmitter to the receiver is received.

4. The method of claim 1, wherein the determination whether there user input is still activated occurs after a predetermined time period.

5. The method of claim 4, herein the predetermined time period is 200 ms.

6. The method of claim 1, wherein the shifting of at least part of the trained carrier frequency by the first frequency increment comprises shifting a first peak of the trained carrier frequency by the first frequency increment.

7. The method of claim 1, wherein the shifting of at least part of the trained carrier frequency by the first frequency increment comprises shifting a first peak and a second peak of the trained carrier frequency by the first frequency increment.

8. The method of clam 1, wherein the first frequency increment is based, at least in part, on a manufacturer identifier.

9. The method of claim 1 further comprising:

determining the first frequency increment, wherein the determination of the first frequency increment comprises:

performing a frequency sweep of a configured control signal from a transmitter associated with the receiver, detecting a characteristic of the control signal, and determining the first frequency increment based, at least in part, on the characteristic.

10. The method of claim 1, wherein the steps of shifting at least part of the trained carrier frequency and transmitting the second control signal occur automatically.

11. The method of claim 1, wherein the steps of shifting at least part of the trained carrier frequency and transmitting the second control signal occur automatically.

12. The method of claim 11, wherein the user input comprises at least one of an actuation of a button, an actuation of a switch, a selection on a touch screen, a selection of a touch-sensitive element, or a voice command.

13. The method of claim 1, wherein the first frequency increment is between 0.2 kHz, inclusive, and 1.5 kHz, inclusive.

14. The method of claim 1, wherein first frequency increment is between 2.0 kHz, inclusive, and 20 kHz, inclusive.

15. An apparatus for transmitting a control signal to a receiver comprising:

a transmitter;

a processor coupled to the transmitter; and a user interface element in communication with the processor, wherein the user interface element comprises at least one of a button, a switch, a touch screen, or a touch-sensitive element;

the processor being configured to:

receive a request to transmit a control signal to a receiver, generate a first control signal using a trained carrier frequency and a control data for transmission using the transmitter, shift at least part of the trained carrier frequency by a first frequency increment, generate a second control signal using the trained carrier frequency shifted by the first frequency increment and the control data for transmission using the transmitter, shift at least part of the trained carrier frequency by a first frequency decrement, generate a third control signal using the trained carrier frequency shifted by the first frequency decrement and the control data for transmission using the transmitter;

determine whether user interface element is activated after a predetermined time;

shift at least part of the trained carrier frequency by a second frequency increment, wherein the second frequency increment is greater than the first frequency increment;

generate a fourth control signal using the trained carrier frequency shifted by the second frequency increment and the control data for transmission using the transmitter;

shift at least part of the trained carrier frequency by a second frequency decrement, wherein the second frequency decrement is greater than the first frequency decrement; and generate a fifth control signal using the trained carrier frequency shifted by the second frequency decrement and the control data for transmission using the transmitter.

16. A method for modifying a trained carrier frequency for a trainable transmitter comprising:

receiving a request to transmit a control signal from the trainable transmitter to a receiver, the request being generated in response to an activation of a user input;

transmitting a first control signal using the trained carrier frequency and a control data, wherein the trained carrier frequency comprises a first peak and a second peak;

shifting the trained carrier frequency by a first frequency value, wherein the first frequency value is one of an increment or a decrement;

transmitting a second control signal using the trained carrier frequency shifted by the first frequency value and the control data;

shifting the trained carrier frequency by the first frequency value and a first peak of the trained carrier frequency relative to the second peak by a peak frequency value, wherein the peak frequency value is an increment or a decrement;

transmitting a third control signal using the trained carrier frequency shifted by the first frequency value and the first peak shifted by the peak frequency value and the control data;

shifting at the trained carrier frequency by a second frequency value, wherein the second frequency value is the other of the increment or the decrement;

transmitting a fourth control signal using the trained carrier frequency shifted by the second frequency value;

determining whether the user input is still activated;

shifting at least part of the trained carrier frequency by a third frequency value, wherein the third frequency value is greater than the first frequency value;

transmitting a fifth control signal using the trained carrier frequency shifted by the third frequency value and the control data;

shifting at least part of the trained carrier frequency by a fourth frequency value, wherein the fourth frequency value is greater than the second frequency value; and transmitting a sixth control signal using the trained carrier frequency shifted by the fourth frequency value and the control data.

* * * * *